United States Patent [19]
Yurescko-Suhan

[11] Patent Number: 5,792,538
[45] Date of Patent: Aug. 11, 1998

[54] PLAYABLE OPTICAL PICTURE DISC

[75] Inventor: Nancy Yurescko-Suhan, Blakely, Pa.

[73] Assignee: WEA Manufacturing, Inc., Olyphant, Pa.

[21] Appl. No.: 808,209

[22] Filed: Feb. 28, 1997

[51] Int. Cl.[6] ........................... B32B 3/00
[52] U.S. Cl. ............... 428/64.1; 428/64.4; 428/64.7; 428/457; 428/469; 428/913; 430/495.1; 430/945; 369/275.4; 369/283; 369/286
[58] Field of Search ................ 428/64.1, 64.2, 428/64.4, 64.7, 457, 469, 913; 430/270.11, 495.1, 945; 369/275.1, 275.4, 283, 286

[56] References Cited

U.S. PATENT DOCUMENTS

| | | | |
|---|---|---|---|
| 5,415,914 | 5/1995 | Arioka et al. | 428/64.1 |
| 5,573,831 | 11/1996 | Suzuki et al. | 428/64.1 |
| 5,702,792 | 12/1997 | Iida et al. | 428/64.1 |
| 5,703,868 | 12/1997 | Kobayashi et al. | 369/286 |

*Primary Examiner*—William Krynski
*Assistant Examiner*—Elizabeth Evans
*Attorney, Agent, or Firm*—Gottlieb, Rackman & Reisman, P.C.

[57] ABSTRACT

A single or multi-sided, single or multi-layered optical data disc in which graphical information resides beneath all layers of data information, while maintaining playability. The graphical information is fully viewable to a user through the layers of data. The conventional metalization layer is replaced by a thin film dielectric coating that provides the reflectivity of the metal to the reading laser frequency while being highly transmissive of the ambient visible spectrum.

13 Claims, 1 Drawing Sheet

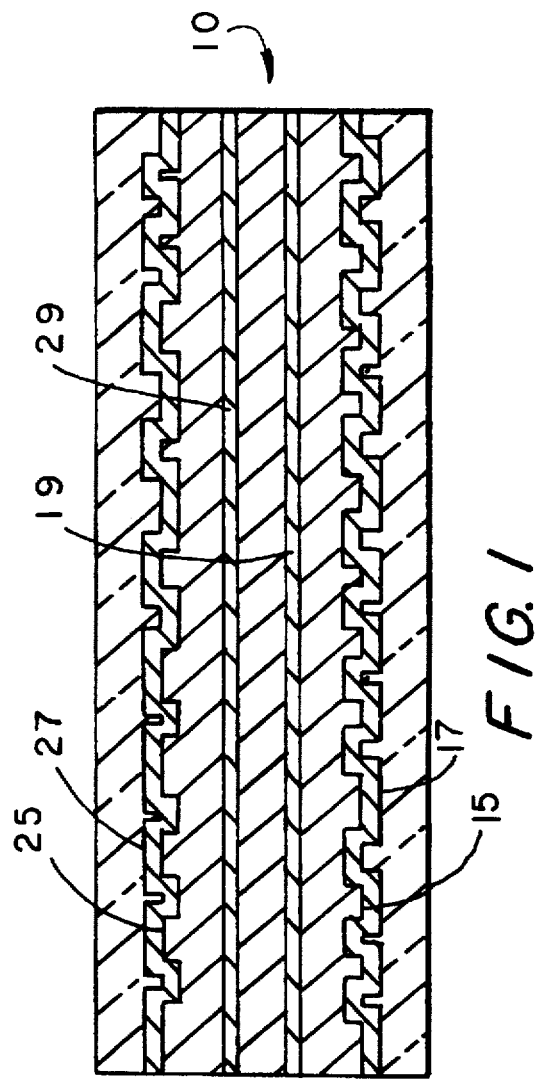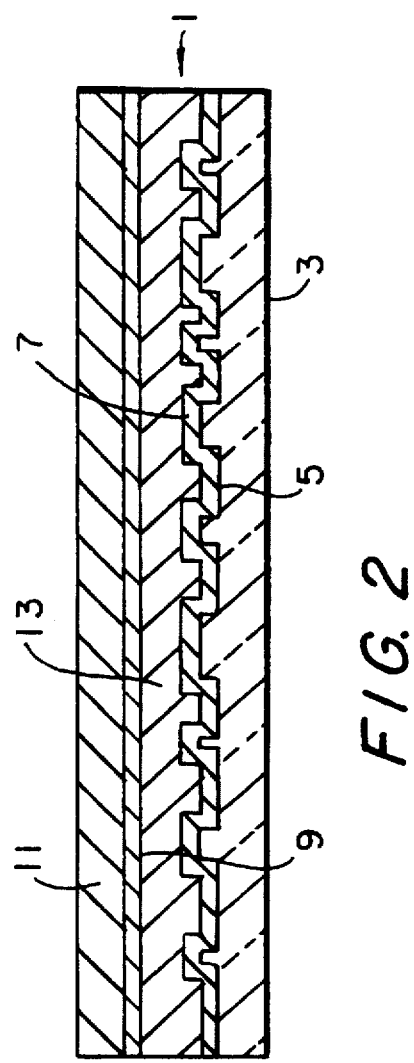

PLAYABLE OPTICAL PICTURE DISC

FIELD OF THE INVENTION

This invention relates to optical data recording compact discs. In particular it relates to the production of such discs that provide graphical information viewable through the data viewing surface of the disc. This invention finds its particular utility in compact discs that have data on more than one surface and in particular where such data is viewed from both sides of the disc.

BACKGROUND OF THE INVENTION

Compact discs are record carriers for digital or analog information, for example audio and/or video information, which have the form of a flat disc-shaped plastic surface on which a data modulated optical structure is provided in accordance with the information. The data is formed as pits of varying length present in the surface and arranged in a spiral path. The pits have nanometer dimensions and are formed by injection molding against a mold having corresponding raised regions. The information stored on the compact disc is recovered in a reader, usually called a player, which rotates the compact disc and guides a laser device along the spiral track as the compact disc rotates. The presence or absence of pits under the laser is detected as a change in the luminance returned from the surface directly below the laser. In this manner the length of the pits is detected and decoded as data.

In order to render the pits and lands more reflective of the laser light the data surface containing the pits and lands is coated with a metallization layer, such as deposited aluminum. The metallization layer block the passage of light through the disc. Normally a logo or other graphic information is printed on the surface of the compact disc that faces the metallization layer. Where there is data on both sides of the compact disc, for example where two compact discs are bonded together to from a double sided data containing disc the metallization layers are internal to the disc and there are no large surfaces where the logo and graphic information can be printed. In that case a small region of the disc near the center becomes the location for the graphic information.

BRIEF DESCRIPTION OF THE INVENTION

The invention comprises a single or multi-sided, single or multi-layered optical data disc in which graphical information resides beneath all layers of data information, while maintaining playability. The graphical information is fully viewable to a user through the layers of data. The invention is accomplished by replacing the metallization layer with a dielectric layer that is still reflective of the laser frequency used to read the data, but is transmissive of a substantial portion of the visual spectrum.

BRIEF DESCRIPTION OF THE DRAWINGS

FIG. 1 depicts a compact disc having two data surfaces and two logos visible respectively from either side of the disc.

FIG. 2 depicts a compact disc having one data surface through which a logo is visible.

DETAILED DESCRIPTION OF A PREFERRED EMBODIMENT

FIGS. 1 and 2 depict cross sectional views of a section of a compact disc having data surfaces through which a logo or other graphic information is visible. Referring to FIG. 2, a CD (compact disc) 1 is shown that will be read through its lower transparent surface 3. The data resides on the opposite surface 5 of this lower component. Over this is deposited a dielectric layer 7. The dielectric layer may be deposited over a balsum layer (not shown) deposited on the surface 5 if it is necessary to adjust a effected refractive index of the dielectric. The dielectric material 7 is reflective of the laser beam that will be used to read the data contained in the layer 5. However, it is transmissive of a broad spectrum of light in the visible spectrum thus allowing, under ordinary light conditions the viewing of the label layer 9 through the surface 3. The label layer 9 may be a silk screened logo or other graphically attractive layer. Optionally it may be covered by a protective layer 11, or the layer 11 may be first printed with the label layer 9 and then adhered to the layer 13 which is coated upon and protects the dielectric layer 7.

FIG. 1 is a somewhat more complex embodiment which involves a double sided compact disc 10 having two data layers 15 and 25, both of which are coated with the dielectric material in dielectric layers 17 and 27. Through these layers are viewed the two label layers 19 and 29.

The uniqueness of the invention lies in the act of removing the traditional metallic reflective coatings long used in the manufacturing of optical data discs and replacing them with coatings with spectrally tuned dielectric coatings.

In this application, spectral tuning the thin film dielectric coating occurs by designing a dielectric thin film coating with a reflectivity equal to the metallic reflectivity at the playback wavelength of the optical reading system. At the same time, the coating transmits 99% of the entire visible spectrum of wavelengths. An optical maintaining full playability/ readability of the encoded optical substrate information.

While there have been shown and described and pointed out the fundamental novel features of the invention as applied to preferred embodiments thereof, it will be understood that various omissions and substitutions and changes in the form and details of the device illustrated and in its operation may be made by those skilled in the art without departing from the spirit of the invention.

What is claimed is:

1. A compact disc for use with a laser having a playback wavelength comprising
    a transparent layer having data encoding pits and lands on one surface thereof,
    a dielectric coating layer deposited on said encoding pits and lands,
    said dielectric coating layer reflective of said playback wavelength,
    said dielectric coating transmitting a visible spectrum of light,
    a layer of graphic information viewable through said transparent layer and through said dielectric coating layer.

2. The compact disc of claim 1 further comprising a laquer layer between said dielectric coating, and said layer of graphic information.

3. The compact disc of claim 2 further comprising a blocking layer applied to said layer of graphic information.

4. The compact disc of claim 1, further comprising a supporting layer adhered to the uppermost of said other layers.

5. The compact disc of claim 2, further comprising a supporting layer adhered to the uppermost of said other layers.

6. A compact disc for use with a laser having a playback wavelength comprising a transparent layer having data encoding pits and lands on one surface thereof, a dielectric coating layer deposited on said encoding pits and lands,
   said dielectric coating layer reflective of said playback wavelength,
   said dielectric coating transmitting a visible spectrum of light,
an adhesive layer,
a supporting layer,
a layer of graphic information viewable through said transparent layer and through said dielectric coating layer, said layer of graphic information on a surface of said supporting layer.

7. The compact disc of claim 6, wherein said layer of graphic information is on the upper surface of said supporting layer.

8. The compact disc of claim 6, wherein said layer of graphic information is on the lower surface of said supporting layer.

9. The compact disc of claim 6, wherein said dielectric coating layer is coated by a laquer layer.

10. The compact disc of claim 9, wherein said layer of graphic information is on the upper surface of said supporting layer.

11. The compact disc of claim 9, wherein said layer of graphic information is on the lower surface of said supporting layer.

12. The compact disc of claim 1, wherein said dielectric coating layer is deposited on a balsum layer which is in turn deposited on said encoding pits and lands.

13. The compact disc of claim 6, wherein said dielectric coating layer is deposited on a balsum layer which is in turn deposited on said incoding pits and lands.

* * * * *